United States Patent
Boston et al.

(10) Patent No.: US 8,967,969 B2
(45) Date of Patent: Mar. 3, 2015

(54) PRESTRESSING DEVICE HAVING RADIAL ACTIVITY

(75) Inventors: Eric Jacques Boston, Cesson (FR);
Michel André Bouru, Montereau-sur-le Jard (FR); Laurent Jablonski, Melun (FR); Philippe Gérard Edmond Joly, Vaux le Penil (FR)

(73) Assignee: Snecma, Paris (FR)

( * ) Notice: Subject to any disclaimer, the term of this patent is extended or adjusted under 35 U.S.C. 154(b) by 501 days.

(21) Appl. No.: 13/388,317

(22) PCT Filed: Jul. 23, 2010

(86) PCT No.: PCT/EP2010/060740
§ 371 (c)(1),
(2), (4) Date: Feb. 1, 2012

(87) PCT Pub. No.: WO2011/015473
PCT Pub. Date: Feb. 10, 2011

(65) Prior Publication Data
US 2012/0128503 A1    May 24, 2012

(30) Foreign Application Priority Data

Aug. 5, 2009   (FR) ...................................... 09 55517

(51) Int. Cl.
*F16F 1/32*    (2006.01)
*F16F 3/02*    (2006.01)

(52) U.S. Cl.
CPC .. *F16F 1/324* (2013.01); *F16F 3/02* (2013.01)
USPC ............ 416/174; 415/229; 384/517; 267/161

(58) Field of Classification Search
CPC ....... F01D 25/04; F01D 25/16; F01D 25/162; F01D 25/164; F05D 2240/50; F05D 2240/52; F05D 2240/54; F16C 25/083; F16F 1/027; F16F 1/18; F16F 1/187; F16F 2230/0005; F16F 2230/0011; F16F 2234/06

USPC .................. 415/229; 416/174; 384/517, 563; 267/158, 159, 160, 161
See application file for complete search history.

(56) References Cited

U.S. PATENT DOCUMENTS 2,089,168 A * 8/1937 Brown ......................... 403/259
2,565,108 A   8/1951 Zahodiakin
(Continued)

FOREIGN PATENT DOCUMENTS

DE   199 19 414    11/2000
JP   59 088553     5/1984

OTHER PUBLICATIONS

International Search Report issued on Aug. 23, 2010 in PCT/EP10/060740 filed on Jul. 23, 2010.

(Continued)

*Primary Examiner* — Edward Look
*Assistant Examiner* — Danielle M Christensen
(74) *Attorney, Agent, or Firm* — Oblon, McClelland, Maier & Neustadt, L.L.P.

(57) ABSTRACT

A prestressing device extending about an axis between a first plane that is substantially perpendicular to the axis and a second plane that is substantially parallel to the first plane and axially offset relative to the latter. The device includes a first annular body extending in the first plane, and a first series of at least three tabs, each of which is connected to the first body and extending in an essentially radial direction, each of the tabs of the first series including a planar surface extending in the second plane. This arrangement ensures surface contact between the parts of the elements to be subjected to prestressing. The device can be used for example for a rotor, and for example for a rotor of an unducted propeller for a turbine engine.

9 Claims, 3 Drawing Sheets

(56) References Cited

U.S. PATENT DOCUMENTS

| | | | |
|---|---|---|---|
| 3,314,232 A * | 4/1967 | Hill | 60/39.24 |
| 5,709,516 A | 1/1998 | Peterson et al. | |
| 2005/0151310 A1 | 7/2005 | Rodeffer | |
| 2007/0051577 A1 * | 3/2007 | Avins et al. | 192/3.29 |

OTHER PUBLICATIONS

U.S. Appl. No. 13/388,461, filed Feb. 2, 2012, Boston, et al.

* cited by examiner

PRESTRESSING DEVICE HAVING RADIAL ACTIVITY

BACKGROUND OF THE INVENTION

1. Field of the Invention

The present invention relates to a prestressing device intended to ensure contact between rolling elements and their rolling track.

It applies in particular to an impeller rotor, with no fairing, for a turbine engine. In these devices, a nut is provided for pressing one of the bearings against the rim of a collar. A locking washer is then provided between the bearing and the nut so as to fix this nut in rotation within the housing of the polygonal ring.

2. Description of the Related Art

A prestressing device is then advantageously provided in order to permanently generate a stress between the pieces. Known prestressing devices include star-shaped springs known as Ringspann washers. Also known are washers with a shape similar to that of Belleville washers. These washers are conical so as to function as a spring and thus permanently stress the pieces in question.

BRIEF SUMMARY OF THE INVENTION

It has been noted that there is a problem with the pieces wearing when the known prestressing devices are used and in particular in the context of mechanical assemblies which are subject to high vibration levels such as, for example, turbine engines.

The object of the invention is in particular to provide a solution to this problem.

The subject of the invention is a prestressing device making it possible to reduce the wear of parts which must be subjected to prestress in all types of assembly.

To this end it proposes a prestressing device which extends about an axis between a first plane substantially perpendicular to the axis and a second plane substantially parallel to the first plane and axially offset with respect to the latter, characterized in that it comprises a first annular body which extends within the first plane with a first series of at least three tabs extending in an essentially radial direction, each of the tabs of the first series comprising a planar surface extending within the second plane. It also comprises a second annular body extending within the first plane with a second series of at least three tabs extending in an essentially radial direction, in the opposite direction from the first series, each of the tabs of the second series comprising a planar surface extending within the second plane.

According to the invention, the device is thus no longer conical but comprises two substantially parallel parts which each extend within a plane perpendicular to its axis. The body is annular and extends within the first plane. It will ensure surface contact with a first piece, in particular a locking washer or a nut. The planar surfaces of the tabs extend within the second plane and hence ensure surface contact with a second piece, in particular one of the bearings of the turbine engine. By virtue of these contact surfaces, the prestressing force is better distributed and a significant decrease is thus obtained in the wear resulting from the contact between the pieces which must be subjected to prestress. The lifetime of the pieces in question is thus increased.

In particular, the first annular body is an inner annular body, the tabs of the first series extending outward, the second annular body is an outer annular body arranged so as to extend around the inner annular body, and in that the tabs of the second series extend inward. A better radial distribution of the prestressing force between the two annular bodies, on the one hand, and the two series of tabs, on the other hand, is thus ensured.

The distance between two successive tabs of each of the series is preferably essentially constant. This ensures a better distribution over the circumference of the pieces which are to be stressed.

Each of the tabs advantageously comprises an inclined zone connecting the annular body to the planar surface.

This inclined zone is displaced as a function of the stress applied.

A first rounded transition zone can be provided between the annular body and the inclined zone. A second rounded transition zone can be provided between the inclined zone and the planar surface. This makes it possible to avoid having acute angles to facilitate the deformation, whilst at the same time preventing a stress concentration. Other rounded parts are preferably also provided.

Advantageously, each tab has a width L and a spacing D is provided between two successive tabs, the values L and D being determined so that the difference D-L lies between 0 and 10 mm, preferably between 2 mm and 7 mm. The number of tabs of each of the series is advantageously chosen between ten and twenty-five and is preferably greater than fifteen. It has been noted that that the distribution of the prestressing force is optimized by the selection of these values.

The present invention also relates to a rotor, in particular an impeller rotor, with no fairing, for a turbine engine, characterized in that it comprises a prestressing device as described above.

BRIEF DESCRIPTION OF THE SEVERAL VIEWS OF THE DRAWINGS

The invention will be better understood and other details, features, and advantages of the present invention will become more apparent on reading the following description, made by way of a non-limiting example and with reference to the attached drawings, in which.

DETAILED DESCRIPTION OF THE INVENTION

Figure 1:
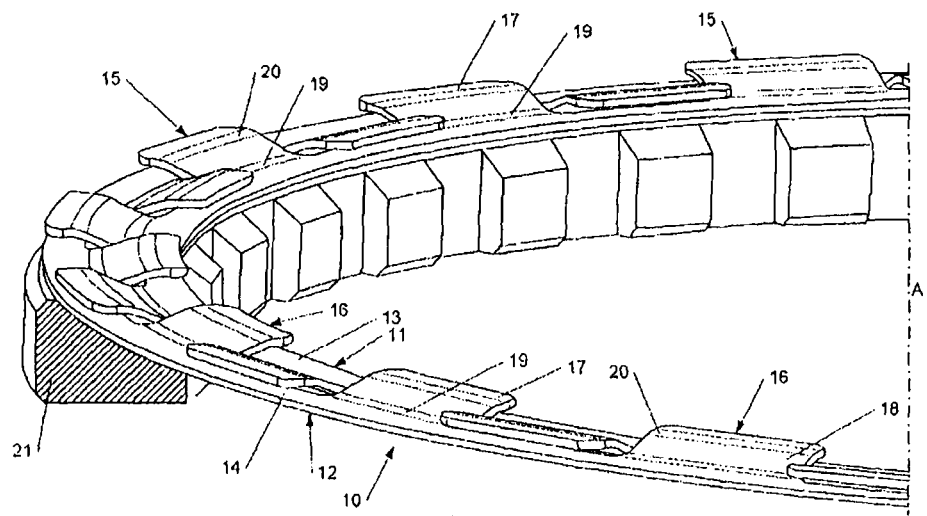
FIG. 1 is a partial perspective schematic view of a prestressing device, according to the invention, on a nut.

Reference is made first to FIG. 1 which shows a prestressing device 10 comprising an inner element 11 and an outer element 12.

The inner element 11 comprises a first annular body 13. This first body extends within a first plane perpendicular to the axis A of the device. The inner element 11 also comprises a first series of tabs 15 each connected to the first body 13 and extending outward in a radial direction.

The outer element 12 comprises a second annular body 14. This second body extends within the first plane. The upper element 12 also comprises a second series of tabs 16 each connected to the second body 14 and extending inward in a radial direction. The inner element 11 and the outer element 12 are given dimensions such that the inner element 11 interlocks with the outer element 12 and that, when the device is fitted, a tab of one of the elements 11, 12 is situated between two tabs of the other of the elements 12, 11.

Each tab 15, 16 comprises a planar surface 17. The planar surfaces 17 of the tabs 15, 16 extend within a second plane parallel to the first plane. The distance between the first plane and the second plane is determined as a function of the desired travel of the device.

The tabs 15, 16 each moreover comprise an inclined surface 18 between the planar surface 17 and the annular body 13, 14. In order to prevent a stress concentration, transition zones 19 and 20 have also been provided between the annular body 13, 14 and the inclined zone 18, on the one hand, and the inclined zone 19 and the planar surface, on the other hand. These transition zones are advantageously rounded. Moreover, all the zones and surfaces of the tabs preferably comprise several other rounded zones which make it possible to better distribute the stressing force.

Figure 2:
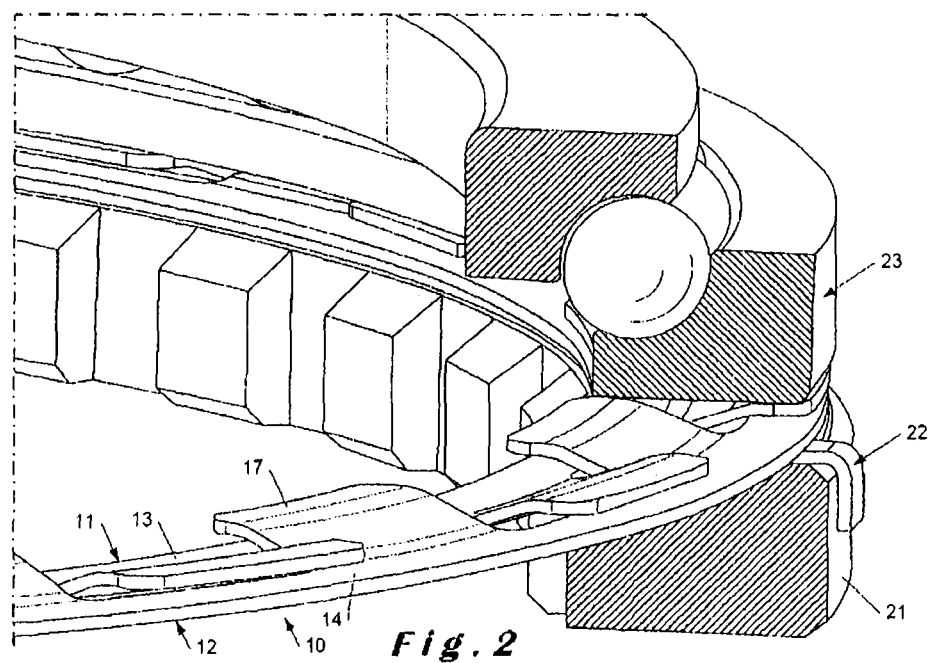
FIG. 2 is a partial perspective schematic view of the device in FIG. 1 placed between the nut and the locking washer, on the one hand, and a bearing, on the other hand.

When the prestressing device is fitted as shown in FIG. 2, it can be seen that the inner and outer elements are placed between the unit formed by a nut 21 and its locking washer 22, on the one hand, and a bearing 23 (a ball bearing in the example shown), on the other hand. The lower surface of the annular bodies 13, 14 is in contact with the upper surface of the locking washer. The planar surfaces 17 of the tabs are in contact with the lower surface of the bearing 23. Genuine surface contact between the different pieces is thus ensured.

Figure 3:
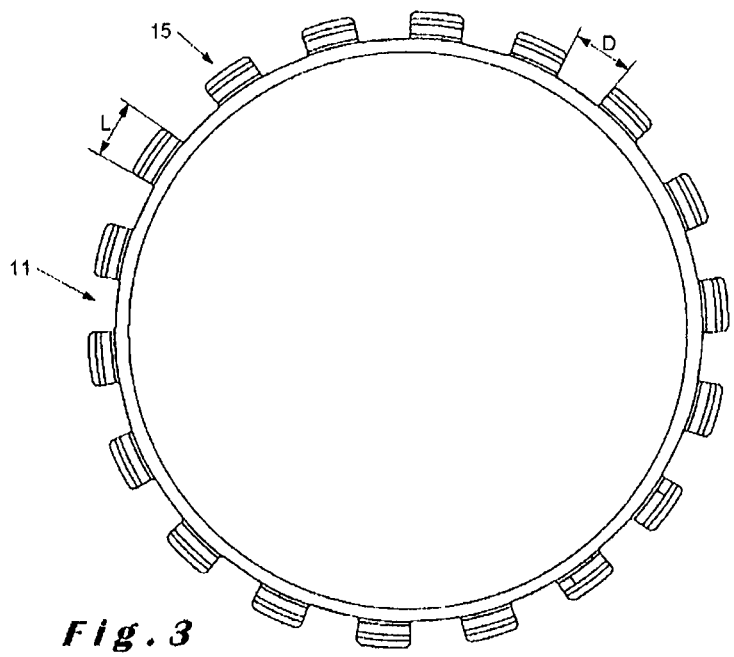
FIG. 3 is a schematic view from above of the inner element of the device according to FIG. 1.
Figure 4:
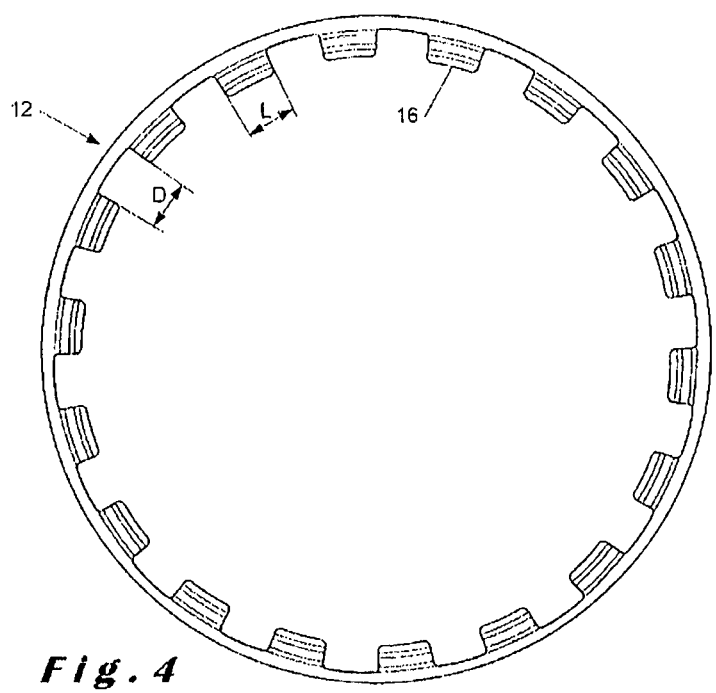
FIG. 4 is a schematic view from above of the outer element of the device according to FIG. 1.

The inner element 11 (FIG. 3) and the outer element (FIG. 4) of the prestressing device each comprise, in the example shown, a series of 18 tabs. Between ten and twenty-five tabs are generally provided per element, and preferably at least fifteen tabs.

Each tab 15, 16 (FIGS. 3 and 4) has a width L which is equal to or preferably slightly less than the spacing D between two tabs so as to ensure an interlocking fit between the inner element 11 and outer element 12 when they are fitted. In practice, it has been noted that the difference between the distance D and the width L must preferably be less than 10 mm.

More particularly, it must have a value between 2 mm and 7 mm. The spacing D is preferably the same between each tab.

In an alternative embodiment (not shown), the number of tabs per element can be less than fifteen. It is also conceivable to provide that the prestressing device comprising just the inner element 11. Similarly, it is possible to conceive a prestressing device consisting of just the outer element 12.

Figure 5:
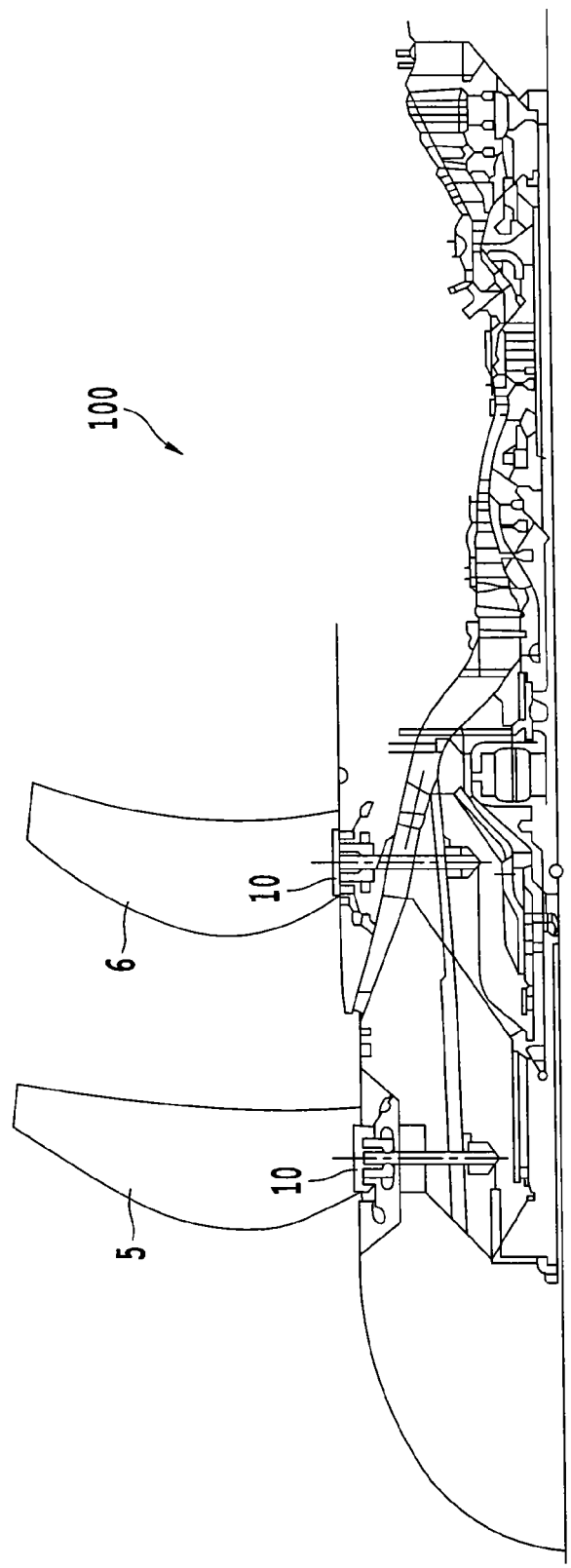
FIG. 5 is a cross section of a turbine engine including the device according to FIG. 1.

The prestressing device according to the invention has been shown fitted in a rotor assembly, which may be an impeller rotor, with no fairing, for a turbine engine 100, as shown in FIG. 5. The prestressing device 10 may be located at a pivot of fan blades 5, 6. It may, however, be used in other assemblies where a permanent stress is required. The device is particularly advantageous in mechanical units which are subjected to high vibration levels such as, for example, turbine engines.

The invention claimed is:

1. A prestressing device which extends about an axis between a first plane substantially perpendicular to the axis and a second plane substantially parallel to the first plane and axially offset with respect to the first plane, comprising:
   a first inner annular body which extends within the first plane with a first series of at least three tabs extending outward in a radial direction from an outer circumference of the first annular body, each of the tabs of the first series comprising a planar surface extending within the second plane offset from the first plane; and
   a second outer annular body extending within the first plane with a second series of at least three tabs extending inward in a radial direction from an inner circumference of the second annular body, each of the tabs of the second series comprising a planar surface extending within the second plane offset from the first plane,
   wherein the first annular body and the second annular body are interlocked with each other, a free edge of the first series of tabs extends radially outward beyond and overlaps the inner circumference of the second annular body, and a free edge of the second series of tabs extends radially inward beyond and overlaps the outer circumference of the first annular body.

2. The device as claimed in claim 1, wherein a distance between two successive tabs of each of the series is essentially constant.

3. The device as claimed in claim 1, wherein each of the tabs comprises an inclined zone connecting the annular body to the planar surface.

4. The device as claimed in claim 3, further comprising a first rounded transition zone provided between the annular body and the inclined zone.

5. The device as claimed in claim 4, further comprising a second rounded transition zone provided between the inclined zone and the planar surface.

6. The device as claimed in claim 1, wherein each tab has a width L, and a spacing D is provided between two successive tabs, values L and D being determined so that a difference between D and L (D-L) lies between 0 and 10 mm.

7. The device as claimed in claim 6, wherein the difference between D and L (D-L) lies between 2 mm and 7 mm.

8. The device as claimed in claim 1, wherein a number of tabs of each of the series is between ten and twenty-five.

9. A rotor, or an impeller rotor, with no fairing, for a turbine engine, comprising a prestressing device as claimed in claim 1.

* * * * *